(12) United States Patent
Weiss

(10) Patent No.: US 8,106,338 B2
(45) Date of Patent: *Jan. 31, 2012

(54) FLAT HEATING ELEMENT

(75) Inventor: Michael Weiss, Benediktbeuern (DE)

(73) Assignee: W.E.T. Automotive Systems AG, Odelzhausen (DE)

( * ) Notice: Subject to any disclaimer, the term of this patent is extended or adjusted under 35 U.S.C. 154(b) by 169 days.

This patent is subject to a terminal disclaimer.

(21) Appl. No.: 12/752,591

(22) Filed: Apr. 1, 2010

(65) Prior Publication Data

US 2010/0187214 A1   Jul. 29, 2010

Related U.S. Application Data

(63) Continuation of application No. 11/803,486, filed on May 15, 2007, now Pat. No. 7,714,256.

(30) Foreign Application Priority Data

Jun. 1, 2006 (DE) .......................... 10 2006 026 047

(51) Int. Cl.
    *H05B 3/34* (2006.01)
(52) U.S. Cl. ........ 219/528; 219/529; 219/211; 219/212; 219/552; 219/553; 219/538; 219/202; 219/217; 219/541
(58) Field of Classification Search ............ 219/202, 219/508, 545, 529, 203, 211, 528, 541, 549, 219/538

See application file for complete search history.

(56) References Cited

U.S. PATENT DOCUMENTS

| 5,824,994 A | 10/1998 | Noda et al. |
| 2003/0024727 A1 | 2/2003 | Petrenko |
| 2007/0257027 A1 | 11/2007 | Krobok |
| 2007/0278214 A1 | 12/2007 | Weiss |

FOREIGN PATENT DOCUMENTS

| DE | 0939579 B1 | 2/1956 |
| DE | 38 32 342 | 7/1989 |
| DE | 4019447 | 2/1991 |
| DE | 4020580 A1 | 1/1992 |
| DE | 4101290 C2 | 7/1992 |
| DE | 4124684 A1 | 1/1993 |
| DE | 196 38 372 | 3/1997 |

(Continued)

OTHER PUBLICATIONS

Co-pending German Application Serial No. DE 10 2004 037 410.4.

(Continued)

*Primary Examiner* — Henry Yuen
*Assistant Examiner* — Brian Jennison
(74) *Attorney, Agent, or Firm* — Dobrusin & Thennisch PC

(57) ABSTRACT

The present invention relates to a heating element for heating at least one surface contacted at times by a user, with a plurality of heating conductors or heating conductor sections that are directly or indirectly connected electrically to one another, at least in part by mutual contact, with at least one heating conductor or heating conductor section which, upon exceeding a permissible maximum temperature, at least temporarily loses its electrical conductivity at least in part. It is provided that the electrical resistance of at least two heating conductors or heating conductor sections is dependent at least in part on its mechanical strain, that these heating conductors or heating conductor sections are electrically connected to one another in parallel, and that they are separated from one another at least in sections by a spacing zone in order to prevent electrical connection between them in spacing zone.

10 Claims, 3 Drawing Sheets

FOREIGN PATENT DOCUMENTS

| | | |
|---|---|---|
| DE | 0758 479 B1 | 5/1998 |
| DE | 101 12 405 A1 | 10/2001 |
| DE | 698 06 636 T | 4/2003 |
| DE | 102 06 336 A1 | 9/2003 |
| EP | 1132028 A | 9/2001 |
| FR | 2263657 A | 10/1975 |
| FR | 2591839 A | 6/1987 |
| JP | 2001-217058 A | 8/2001 |
| WO | 2005/089019 A2 | 9/2005 |

OTHER PUBLICATIONS

International Search Report dated Sep. 30, 2005, PCT/DE2005/000189 (Published as WO2005/089019).

Co-pending U.S. Appl. No. 11/800,669, filed May 7, 2007, published as 2007-0257027.

Co-pending U.S. Appl. No. 10/598,453, filed Aug. 31, 2006, published as 2007-0278214.

Figur 1
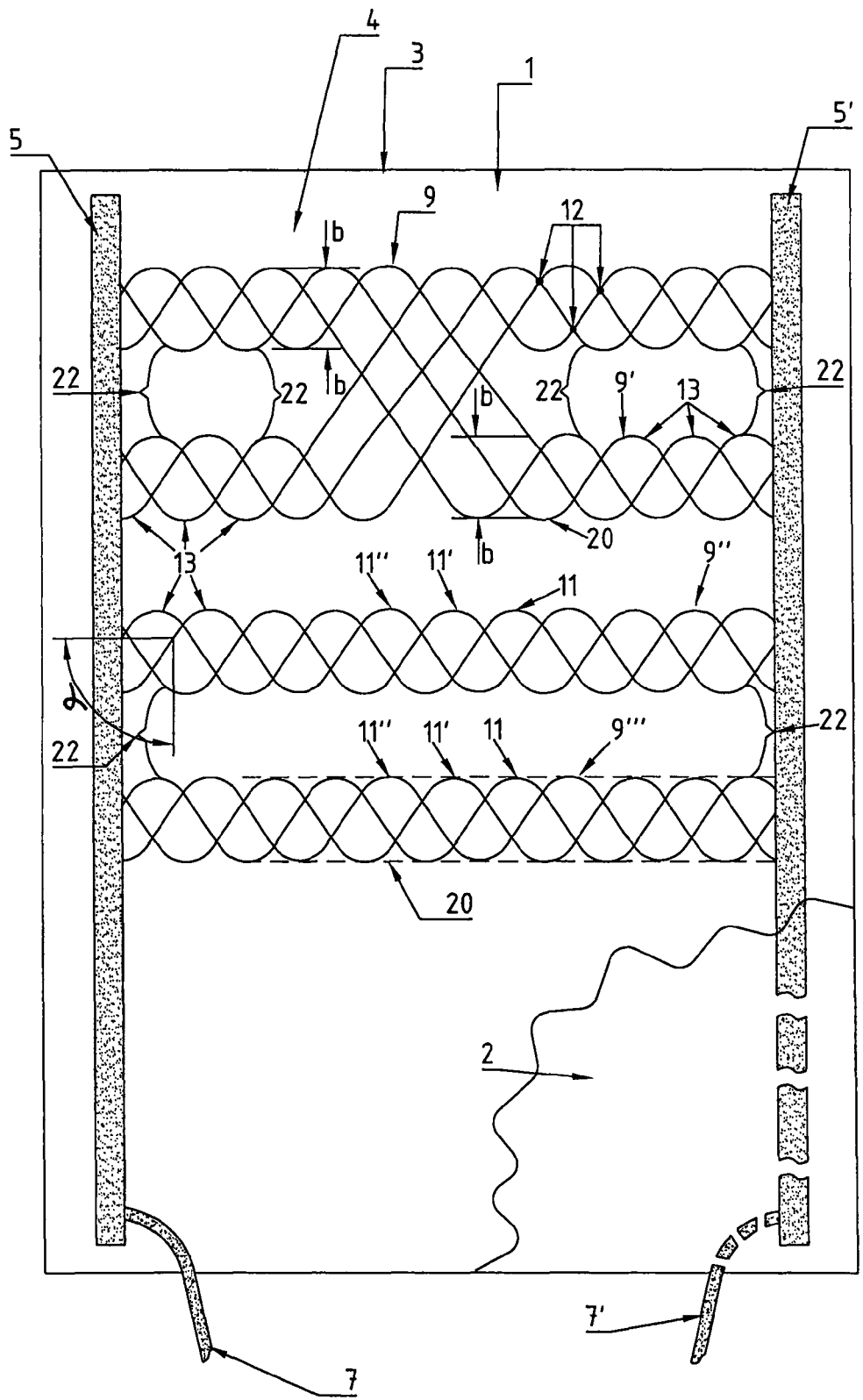

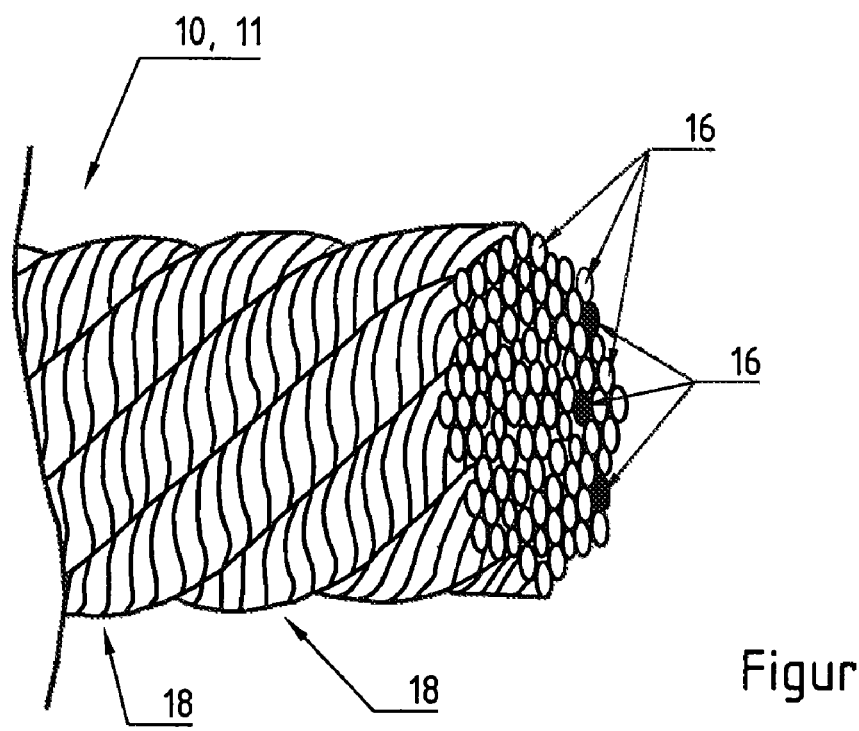
Figur 3
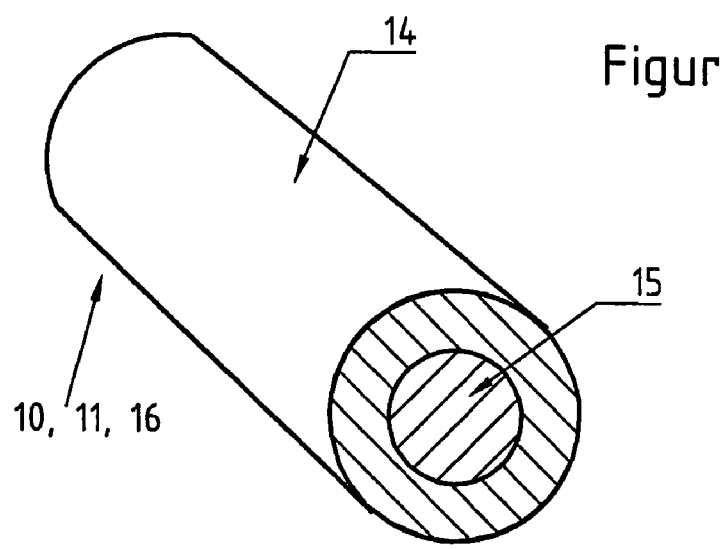
Figur 2

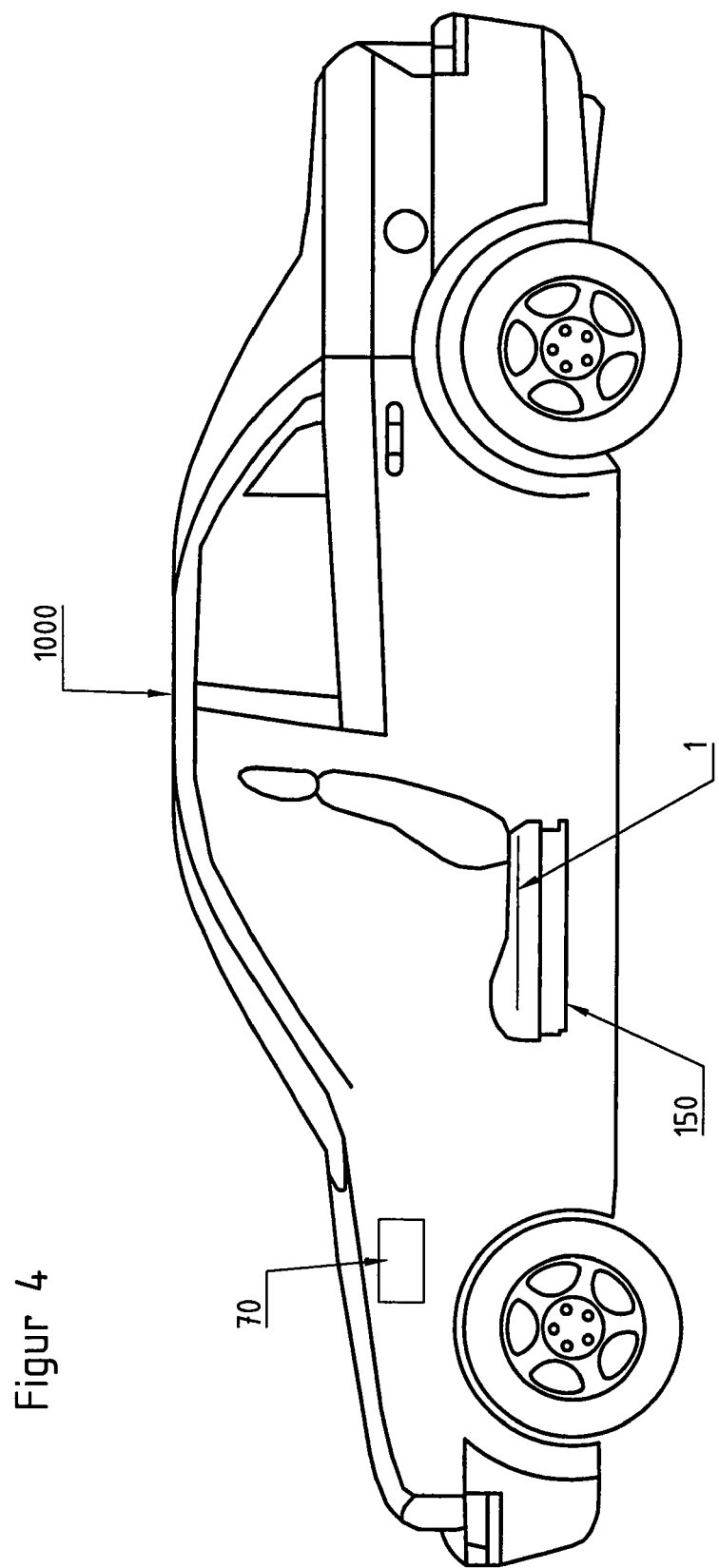
Figur 4

FLAT HEATING ELEMENT

CLAIM OF PRIORITY

"This application is a continuation of copending U.S. application Ser. No. 11/803,486, filed May 17, 2007, which in turn claims priority to German Application No. DE 102006026047.3, filed Jun. 1, 2006, the contents of which are hereby incorporated by reference in their entirety."

CLAIM OF BENEFIT OF EARLIER FILING DATE

The present application claims the benefit of the filing date of German Application Nos. DE 102006026047.3 (filed Jun. 1, 2006) the contents of which are hereby incorporated by reference in their entirety.

TECHNICAL FIELD

The present invention relates to flat heating elements, particularly for heating user-contacted surfaces in the passenger compartment of a vehicle, to seats, particularly for vehicles, as well as to vehicles according to the preambles of the independent claims.

BACKGROUND OF THE INVENTION

A heating element in which a plurality of interconnected heating conductors is laid between two electrodes is known from DE 101 12 405. In case one of the heat conductors breaks, the networking of the heat conductors among one another leads to a diversion of current around the breakage point. Despite its breakage, this heating element 1 will continue to uniformly heat the surface to be heated. Precisely because of the networking of the heating conductors among one another, undesired concentrations of current can arise when an electrode breaks. Thereby overheating may occur in this region.

Heating elements with one or more contact conductors that are electroconductively connected to one another by several heating conductors are known. These heating conductors and/or contact conductors can consist, for instance, of copper or another suitable conductor material with sufficient electrical conductivity and can be shielded and/or reinforced, if desired, by an outer insulation. Conductors made of copper, however, can be stressed mechanically only to a limited extent, so that malfunctions due to material fatigue and/or breakage may occur. This is due primarily to the copper material's insufficient fatigue strength under reversed bending. Breakage of contact or heating conductors can occur in such heating elements. In this case, an interruption of the supply of electrical power occurs at the breakage point. The heating element 1 is then no longer functional, at least in the areas through which current no longer flows.

Contacting a plurality of heating conductors to a plurality of contact conductors, in order thereby to create redundancy in case of the failure of a conductor, is known from DE 41 01 290. There are application cases, however, in which the heating elements described there are still not sufficiently robust.

A heating element is known from DE 10 2004 037 410.4, in which the heating conductors are grouped into several mutually independent bands in order to reduce the likelihood of hot spots in case of electrode breakages. This problem does not arise in the present case, however, since the heating conductors prevent overheating by the very fact that they melt.

Coating copper conductors with silver to protect them against corrosion is known. If the applied silver is not free of pores, however, the copper can still be attacked. Moreover, silver diffuses into the copper over time. Thereby an Ag—Cu alloy is formed that is very brittle. Breakages of this boundary layer form the beginnings of cracks, which may also put the conductor at risk.

So-called clad wires, in which thread-like electrical conductors having a cladding of copper are provided with a steel core, can be used to remedy this problem. A clad wire consisting of a cladding made of platinum and a core of a noble metal material is known from DE 38 32 342 C1. The core can be adapted for criteria such as flexibility, tear and tensile strength, and reversal bending strength, while the cladding can be optimized for the desired electrical properties.

A clad wire with a core of stainless steel wire and a cladding of copper is known from DE 196 38 372 A1. Finally, a clad wire in which the cladding is made of steel and the core of copper, or optionally, the reverse, is described in DE 102 06 336 A1.

An important disadvantage of this material combination is the relatively high cost and only limited corrosion resistance of the clad wires. The copper sheath does conduct the electric current sufficiently well for most applications, but for many purposes it is not sufficiently resistant to corrosion.

A heating conductor in which a plurality of carbon fibers is sheathed by a shrink-fit tube is known from JP 2001-217058.

A heating blanket in which a heating conductor is furnished with a layer that melts at impermissibly high temperatures and interrupts the heating current is known from DE 698 06 636 T2. The heating conductors described there are relatively thick, however, and therefore not suited to vehicle seats since they interfere with comfortable sitting.

An electrical heating element 1, in which plastic surfaces with a metallic coating are used as heating conductors and/or contact conductors, is known from WO 2005/089019 A2. In order to avoid excess heat build-up in the surroundings, such heating elements self-destruct when a defined temperature is exceeded. Unfortunately, undesired initiation of this self-destruction effect can occur due to material fatigue, so that such heating elements sometimes have an undesirably short service life.

SUMMARY OF THE INVENTION

To enhance the state of the art, a heating element, a seat and a vehicle according to the independent claims are therefore proposed.

The invention is particularly advantageous in regard to the operating safety, ability to withstand stress, spectrum of use, and service life of the resulting products.

Additional advantageous configurations follow from the dependent claims and the description of figures below.

DEFINITIONS

Essential terms in this document will be explained.

A strand is an elongated structure, the longitudinal dimensions of which far exceed its cross section. Preferably both dimensions of the cross section have roughly similar measurements. The structure is preferably flexurally elastic but in a solid overall state.

Filament-like is understood here to mean that the object thus referred to is formed from a short or long fiber or from a monofilament or multifilament thread.

A conductor strand is a strand in which one, several, or many filament-like electrical conductors run, preferably substantially along the longitudinal direction of the strand. A conductor strand can itself be constructed from a plurality of conductor strands.

A cladding layer is a layer that directly or indirectly sheathes a strand, at least in part, but is not necessarily the outermost layer sheathing the strand.

A synthetic is any synthetic material not occurring in nature, particularly polymers and substances derived therefrom such as carbon fibers.

Temperature-resistant means that at most, the respective material changes its shape and strength insubstantially under everyday temperature changes, remains chemically stable, and maintains the same overall state as under standard ambient conditions.

Chemically inactive means inert, i.e., the thus designated object does not change even as an effect of corrosive substances, at least not of substances such as sweat, carbonic acid or fruit acids.

Metallization is understood to be the provision with a metallic coating by, for example, galvanizing or sputtering.

A bundle is not understood here to mean only a collection of individual strands into an elongated overall arrangement with roughly a cylindrical cross section. A bundle of heating conductors is understood below as a number of heating conductors that are arranged within an elongated area that is spatially delimited, at least conceptually, and are considered as belonging together functionally and/or spatially, and/or are arranged side by side at least relative to their overall extent.

"Substantially" is understood to mean here, in particular, "at least 50%," preferably "at least 70%, 90%, 95% and 99%."

Mechanical strain is understood here as any elastic or plastic flexing, elongation or compression, particularly any tensile stress. This also means currently active stresses, but particularly the forces acting on the corresponding part in the past.

BRIEF DESCRIPTION OF THE DRAWINGS

Details of the invention will be explained below. These discussions are intended to make the invention comprehensible. They have only the character of examples, however. It goes without saying that individual or multiple described characteristics can also be omitted, modified or added. The characteristics of different embodiments can also be combined with one another. Reference will be made below to:

FIG. 1, a plan view of a flat heating element;

FIG. 2, an enlarged cross section of an electrical individual strand;

FIG. 3, an enlarged perspective view of a complete bundle of heating conductors; and FIG. 4, a side view of a vehicle with heated seat, in a partial vertical section.

DETAILED DESCRIPTION OF THE INVENTION

Figure shows a heating element 1. It comprises a carrier layer 3. Carrier layer 3 is preferably produced from a textile material such as a knit or a felt material. In the present case it has rectangular dimensions. Two electrodes 5, 5' are arranged along the long edges of carrier layer 3. The electrodes are formed from, for instance, conductive threads, copper stranded wires, electrically conductive adhesives, electrically conductive foils, combinations thereof or the like.

Electrodes 5, 5' are arranged at least roughly parallel to one another, and are each connected at one of their ends via power supply line 7, 7' to a current or voltage source 70 (shown in FIG. 4).

Bundles 9, 9', 9" of heat conductors 11, 11', 11" run at an angle (a) to the electrodes. In the present case, these bundles 9, 9', 9" are arranged perpendicular to the electrodes. They are arranged on carrier layer 3. They are preferably fixed there with adhesive. They can also be laid on, sewn on or knitted on.

At least one heating conductor 11, 11', 11" comprises at least one filament in the form of an individual strand 16 of a plastic according to FIG. 3, which is metallized, i.e., coated with a metal cladding layer 14, in this case with a silver coating. Inner strand 15 is made of an elastic, tear-resistant and temperature-resistant synthetic material, particularly a thermoplastic, in particular, polyamide, which is very rupture-resistant, tear-resistant and temperature-resistant. It is coated with a cladding layer 14 of nickel, gold, silver or gold-silver alloy that can be applied, in particular, by electroplating. Cladding layer 14 is very ductile and thus very resistant to reversed bending over a long service life. Inner strand 15 is very tear-resistant and resistant to reversed bending.

The diameter of inner strand 15 can lie between about 0.01 mm and about 1 mm, while a reasonable diameter for the entire strand 16 can be from 0.02 mm to 3 μm. It can further be provided that inner strand 15 and cladding layer 14 have cross-sectional areas in a ratio between 1:4 and 10:1, preferably that inner strand 15 and cladding layer 14 have roughly equal cross-sectional areas.

Individual strand 16 has an electrical resistance that is dependent on its past. If individual strand 16 is subjected to a mechanical strain, elongation for example, then the electrical resistance rises with increasing elongation. If the individual strand is then relaxed again, the resistance declines, but is higher than in the unstressed state prior to elongation. The resistance value measured after elongation in the relaxed state is higher the more intensively the individual strand was stretched.

The resistance thus records the past mechanical strain and its magnitude.

If individual strand 16 is heated to a temperature of roughly 120° C. for a thermoplastic, then the resistance value returns to the initial value before elongation. A heat treatment thus erases the memory.

If the maximum elongation does not exceed 10%, then this process can be repeated arbitrarily often.

For an elongated individual strand 16, the resistance is strongly, exponentially dependent on the elongation. If several individual strands 16 are bundled in the form of threads into a strand bundle 17 as in FIG. 3, this yields a considerably weaker, but still exponential, dependency of resistance on elongation. This can be explained by the fact that the individual strand has microscopic or macroscopic interruptions in the silver layer, which are then bridged to a large extent by the adjacent individual strands in the thread by contact among one another. The memory property is preserved, however, even for strand bundle 17 bundled together from several individual threads 16.

In a strand bundle 17, 30 to 50 individual strands 16, for example, can be twisted together into a component thread 18, several of which can in turn be twisted into an electrical complete bundle 19. Thus a heating conductor 11, 11', 11" that can be sewn without problems can be formed with a plurality of individual strands 16. If heating conductor 11, 11', 11" is penetrated by a needle then only a few individual strands 16 are damaged, without significantly influencing the overall functioning or the electrical or mechanical properties of the complete bundle of conductor strands.

If a network structure is produced from a strand bundle and operated between two electrodes, then two opposed, self-reinforcing mechanisms act on the construction. Strand bundles with a memory property in the network become high-resistance due to mechanical strain. Less high-resistance strand bundles allow more current to flow and therefore become hotter, whereby their memory is better erased and they are returned to the low-resistance initial state. The higher-resistance strand bundles do not become so hot, due to the lower current flow, whereby they more or less retain their memory, and can become even more resistant due to further mechanical strain. Thus low-resistance current paths are formed over time in the network. If the network is very large, then very high current loads can develop in individual low-resistance strand bundles, thus causing this heating strand bundle to melt. This is remedied here by subdividing the entire network into sufficiently small independent bundles 9, 9', 9" of heating conductors 11, 11', 11" and thus limiting it. Hence the maximum possible current for a low-resistance current path is limited to a noncritical value.

Bundles 9, 9', 9" of heating conductors 11, 11', 11" preferably do not touch one another. A sufficient number of bundles 9, 9', 9" are preferably provided to uniformly heat a base surface 4 to be heated that is provided between electrodes 5, 5'.

Heat conductors 11, 11', 11" are preferably arranged in meandering form on or inside a ribbon-like strip 20. Strip 20 can be formed by a fabric underlayer, an adhesive strip or the like. It can, however, also be a purely conceptual delimitation of a space in which heating conductors 11, 11', 11" of a heating bundle 9, 9', 9" are arranged.

Heating conductors 11, 11', 11" can expediently also be laid down in a zigzag shape, in a straight line or in some other manner. At least one of heating conductors 11, 11', 11" is expediently arranged such that it crosses a plurality of other heating conductors 11, 11', 11" and thus creates connection points 12 to other heating conductors 11', 11".

In the present case, heating conductors 11, 11', 11" of a bundle 9, 9', 9" are laid down in a wave or sinusoidal shape with equally large "amplitude" and an identical center line. They are also offset from one another by the fraction (divided by the number in the bundle (3 in this case)) of a "wave" along the centerline of the bundle.

The individual bundles 9, 9', 9" of heating conductor 11, 11', 11" in the present example run in a straight line from one electrode 5 to the other electrode 5'. However, they can also be laid in a meandering shape, curved shape, or in some other way.

For the fixation of the entire arrangement it can be expedient, as in the example of an embodiment, to arrange a cover layer 2 on carrier layer 3 such that electrodes 5, 5' and heating conductors 11, 11', 11" are embedded between cover and carrier layer.

It can be expedient for the heating element to be built into a vehicle seat, a steering wheel, an arm rest, a heating blanket or the like. FIG. 4 shows a heating element that is built into a seat 150 of a vehicle 1000. The heating element can be situated in a seat insert or, as here, between the covering surface and the seat cushion. It can also be expedient for the heating element to be built into a larger subsystem to supply the seat user with heating, cooling, ventilation, etc.

It is expedient if:

heating conductor 11, 11', 11" and/or heating conductor section 13 extends at least in part between two electrodes 5, 5', heating conductor 11, 11', 11" and/or heating conductor section 13 is elongated—in particular, strand-like—at least in part, in operation, current flows through heating conductor 11, 11', 11" and/or heating conductor section 13 substantially in the direction of its longest extension direction.

It is expedient if at least two heating conductors 11, 11', 11" and/or heating conductor section 13 and/or bundles 9, 9' of heating conductors are separated from one another over substantially the entire distance between two electrodes 5, 5'.

When heating element 1 is connected to power, then current flows from the supply device via supply line 7 into electrode 5. Since electrode 5 is markedly more conductive electrically than heating conductors 11, 11', 11", the heating current distributes itself uniformly onto bundles 9, 9', 9" of heating conductors 11, 11', 11" that are connected to the electrode. The current then flows from electrode 5 through heating conductors 11, 11', 11" of base surface 4 to be heated to electrode 5' and from there via supply line 7' back to the current/voltage source. The current amperage of the heating current here is, for instance, between 4 and 5 A at an operating voltage of 12 V.

It can be expedient to sew heating element 1 into a cover or the like.

From the above, it can be seen that the invention can also be described with reference to the following paragraphs.

A. Heating element (1) for heating at least one surface contacted at times by a user, with a plurality of heating conductors (11, 11', 11") or heating conductor sections (13) that are directly or indirectly connected electrically to one another, at least in part by mutual contact, with at least one heating conductor (11, 11', 11") or heating conductor section (13) which, upon exceeding a permissible maximum temperature, at least temporarily loses its electrical conductivity at least in part, characterized in that the electrical resistance of at least two heating conductors (11, 11', 11") or heating conductor sections (13) is dependent at least in part on its mechanical strain, in that these heating conductors (11, 11', 11") or heating conductor sections (13) are electrically connected to one another in parallel, and in that they are separated from one another at least in sections by a spacing zone (22) in order to prevent an electrical connection between them in spacing zone (22).

B. Heating element (1) according to Paragraph A, characterized in that heating element (1) is furnished with at least two electrodes (5, 5') for supplying heating element (1) with power and with a plurality of heating conductors (11, 11', 11") and/or heating conductor sections (13), which are arranged, passing over at least a part of base surface (4) to be heated, between electrodes (5, 5') and electrically connected thereto.

C. Heating element (1) according to any of the preceding paragraphs A or B, characterized in that heating element (1) comprises at least two bundles (9, 9', 9") of heating conductors (11, 11', 11") and/or heating conductor sections (13), and in that the two bundles (9, 9', 9") and/or heating conductor sections (13) are arranged spaced apart from one another in order to prevent electrical contact between the two bundles (9, 9', 9").

D. Heating element (1) according to Paragraph A, characterized in that a bundle (9, 9¢, 9²) comprises at least two, preferably at least three heating conductors (11, 11', 11"), which are preferably fixed on base surface (4).

E. Heating element (1) according to any of the preceding paragraphs A through D, characterized in that at least one heating conductor (9, 9', 9"') is formed at least in a certain proportion from copper, carbon particles, carbon fibers, carbonized plastic filaments, silver, gold, polyamide, and/or combinations thereof, and/or that a heating conductor (11, 11', 11") comprises one or more monofilament heating conductor strands, one or more multifilament heating conductor strands, and/or one or more mechanical reinforcement devices, wherein these constituents are preferably arranged parallel, concentrically, or in a zigzag, meandering and/or spiral shape relative to the running direction of heating conductor (11, 11', 11")

F. Heating element (1) according to any of the preceding paragraphs A through E, characterized in that at least one bundle (9, 9', 9") of heating conductors (11, 11', 11") comprises a ribbon-like strip (20), inside of which heating conductors (11, 11', 11") are arranged, preferably one alongside the other.

G. Heating element (1) according to any of the preceding paragraphs A through F, characterized in that at least two, preferably all, heating conductors (11, 11', 11") of a bundle (9, 9', 9") are arranged at least in a considerably large part of their extent spaced apart from one another—preferably also spaced apart from all other heating conductors possibly present—in bundle (9, 9', 9"), in that at least one heating conductor (11, 11', 11")—preferably all of them—comprises a plurality of bends and/or inflection points in order to form a plurality of connection points 12 to at least one—preferably all—other heating conductors (11, 11', 11"), at which the heating conductors (11, 11', 11") involved are electrically connected to one another, and which are preferably arranged distributed over substantially the entire length of bundle (9, 9', 9") and/or heating conductor (11, 11', 11").

H. Heating element (1) according to any of the preceding paragraphs A through G, characterized in that at least two heating conductors (11, 11', 11") are different from one another in their structure or material composition, and/or at least two are of the same type.

I. Heating element (1) according to any of the preceding paragraphs A through H, characterized in that at least one heating conductor (11, 11', 11") comprises at least one conductor strand (10), in particular, an individual strand (16), which comprises at least one inner strand (15) and at least one, preferably electrically conductive, cladding layer (14) sheathing this inner strand (15), and/or which comprises nickel-plated carbon fibers or consists substantially of a nickel alloy or pure nickel, in particular, as a multifilament strand.

J. Heating element (1) according to any of the preceding paragraphs A through I, characterized in that at least one inner strand (15) comprises a material that is heat-resistant at least to 75° C., preferably to 150° C., preferably to 300° C., preferably to 500° C., preferably to 1000° C.

K. Heating element (1) according to any of the preceding paragraphs A through J, characterized in that inner strand (15) is metallizable, in that cladding layer (14) is applied electrolytically to inner strand (15), and/or that cladding layer (14) is integrally connected to inner strand (15).

L. Heating element (1) according to any of the preceding paragraphs A through K, characterized in that inner strand (15) has a diameter of less than 100 µm, preferably less than 10 µm, preferably less than 1 µm, preferably less than 0.1 µm, preferably less than 0.01 µm, and/or in that the thickness of cladding layer (14) is between 0.2 and 2 µm, preferably between 0.5 and 1.5 µm, preferably between 0.8 and 1.2 µm, and/or in that individual strand (16) and/or heating conductor (11, 11', 11") has a thickness of less than 1 mm, preferably less than 0.1 mm, preferably less than 10 mm.

M. Heating element (1) according to any of the preceding paragraphs A through L, characterized in that inner strand (15) is produced at least in part from a synthetic material that is preferably elastic and tear-resistant, preferably at least in part, better yet, substantially entirely, from a thermoplastic, polyamide, carbon fiber, polypropylene, polyester or polyimide, and/or at least in part from glass silk and/or steel, and/or in that the material of inner strand (15) has a higher resistance to reversed bending and/or a markedly higher material price and/or a lower tensile or compressive strength than the material of cladding layer (14).

N. Heating element (1) according to any of the preceding paragraphs A through M, characterized in that cladding layer (14) has a surface that is chemically inactive under ordinary environmental conditions at least on its surface facing outward (relative to the inner strand).

O. Heating element (1) according to any of the preceding paragraphs A through N, characterized in that cladding layer (14) contains metal, preferably produced at least in part from an alloy of nickel with phosphorus components, of silver, copper and/or of gold, and preferably of an alloy formed substantially entirely of silver, copper, gold and/or nickel, in that cladding layer (14) comprises a metal the surface of which can be passivated, and/or in that the surface of cladding layer (14) is oxidized and/or chromated.

P. Heating element (1) according to any of the preceding paragraphs A through O, characterized in that the surface of cladding layer (14) is coated, in particular, with a plastic and/or a lacquer and/or at least in part with polyurethane, PVC, PTFE, PFA and/or polyester.

Q. Heating element (1) according to any of the preceding paragraphs A through P, characterized in that at least one conductor strand (1, 2, 3 a, 10) comprises a plurality of individual strands (16), preferably more than five, preferably more than 50, preferably more than 100, and preferably more than 300.

R. Heating element (1) according to any of the preceding paragraphs A through Q, characterized in that a plurality of individual strands (16) one or more conductor strands (1, 2, 3 a, 10) is provided, which are electrically insulated from one another at least in sections, preferably in that at least one individual strand (16) is at least partially insulated by means of an insulation layer (18) on its cladding layer (14), and/or in that conductor strand (10) and/or an individual conductor (16) is sheathed at least in sections with a plastic (72), in particular, with a heat-activatable plastic.

S. Heating element (1) according to any of the preceding paragraphs A through R, characterized in that several individual strands (16) collected into a strand bundle (17) are provided and in that preferably several strand bundles (17) and/or bundles of strand bundles (17) are collected into an overall bundle (19), wherein the conductor strand (10) and/or at least one individual strand (16) preferably has a spiral-shaped arrangement, preferably by being twisted, stranded or plaited.

T. Heating element (1) according to any of the preceding paragraphs A through S, characterized in that conductor strand (2, 3 a, 10) and/or an individual strand (16) has a electrical resistance between 0 and 3 W/m, preferably between 0 and 2 W/m, preferably between 0.1 and 0.3 W/m, and/or in that at least one conductor strand (1) for heating element (20) has an electrical resistance between 0.1 and 3 W/m, preferably between 0.2 and 0.5 W/m.

U. Heating element (1) according to any of the preceding paragraphs A through T, characterized in that conductor strand (1, 2, 3 a, 10) is worked into a knit and/or a braid, in that it is laid on a textile and fixed on the textile by means of a sewing or knitting thread, in that it is woven into a textile as a sewing thread, and/or that it is adhered to at least one textile and/or adhered between two textile layers.

V. Seat (150), in particular, a vehicle seat, characterized in that it is equipped with at least one heating element (1) according to one of the preceding paragraphs A through U.

W. Vehicle (1000), in particular, a motor vehicle, characterized in that it is equipped with at least one heating element (1) and/or seat (150) according to one of the preceding paragraphs A through V.

LIST OF REFERENCE SYMBOLS b Width of the bundle
1 Heating element
2 Cover layer
3 Carrier layer
4 Base surface to be heated
5, 5' Electrode
7, 7' Connecting lines
9, 9' Bundles of heating conductors
10 Conductor strand
11, 11', 11" Heating conductors
12 Connecting points of the heating conductors
13 Heat conductor section
14 Cladding layer
15 Inner strand
16 Individual strand
17 Strand bundle
18 Component thread
19 Overall bundle
20 Ribbon-like strip
22 Spacing zone
70 Power source
15 Seat
1000 Vehicle

What is claimed is:

1. A heating element for heating at least one surface contacted at times by a user comprising:
 a: a carrier layer;
 b: at least two electrodes arranged along opposing edges of the carrier layer; and
 c: a plurality of heating conductors, each comprised of at least one filament, connectively disposed between the at least two electrodes and the at least one filament with a initial resistance value;
wherein the at least one filament includes a polymeric inner strand and an metal cladding layer, further wherein the at least one filament when subject to a mechanical strain and creating an elongation in the at least one filament, has a second resistance value, and when subject to a heat, returns from the second resistance value to the first resistance value.

2. The heating element according to claim 1, wherein the heat is at least 75° C.

3. The heating element according to claim 1, wherein the heat is at least 120° C.

4. The heating element according to claim 1, wherein elongation is less than 10%.

5. The heating element according to claim 1, wherein the heating conductors comprise two or more filaments forming a strand bundle.

6. The heating element according to claim 5, wherein the strand bundle when subject to the mechanical strain and creating the elongation in the strand bundle, has a lower second resistance value than that of the at least one filament alone.

7. A heating element for heating at least one surface contacted at times by a user comprising:
 a: a carrier layer;
 b: at least two electrodes arranged along opposing edges of the carrier layer; and
 c: a plurality of heating conductors, each comprised of at least one filament, connectively disposed between the at least two electrodes and the at least one filament with a initial resistance value;
wherein the at least one filament includes a polymeric inner strand and an metal cladding layer, further wherein the at least one filament when subject to a mechanical strain and creating an elongation of less than 10% in the at least one filament, has a second resistance value, and when subject to a heat of at least 75° C., returns from the second resistance value to the first resistance value.

8. The heating element according to claim 7, wherein the heat is at least 120° C.

9. The heating element according to claim 7, wherein the heating conductors comprise two or more filaments forming a strand bundle.

10. The heating element according to claim 9, wherein the strand bundle when subject to the mechanical strain and creating the elongation in the strand bundle, has a lower second resistance value than that of the at least one filament alone.

* * * * *